Jan. 13, 1959 H. M. REEVES 2,868,190
ADJUSTABLE BROILER MECHANISM
Filed Dec. 24, 1954 2 Sheets-Sheet 1

Inventor
Herbert M. Reeves
Carlson, Pitzner, Hubbard, & Wolfe
Attorneys

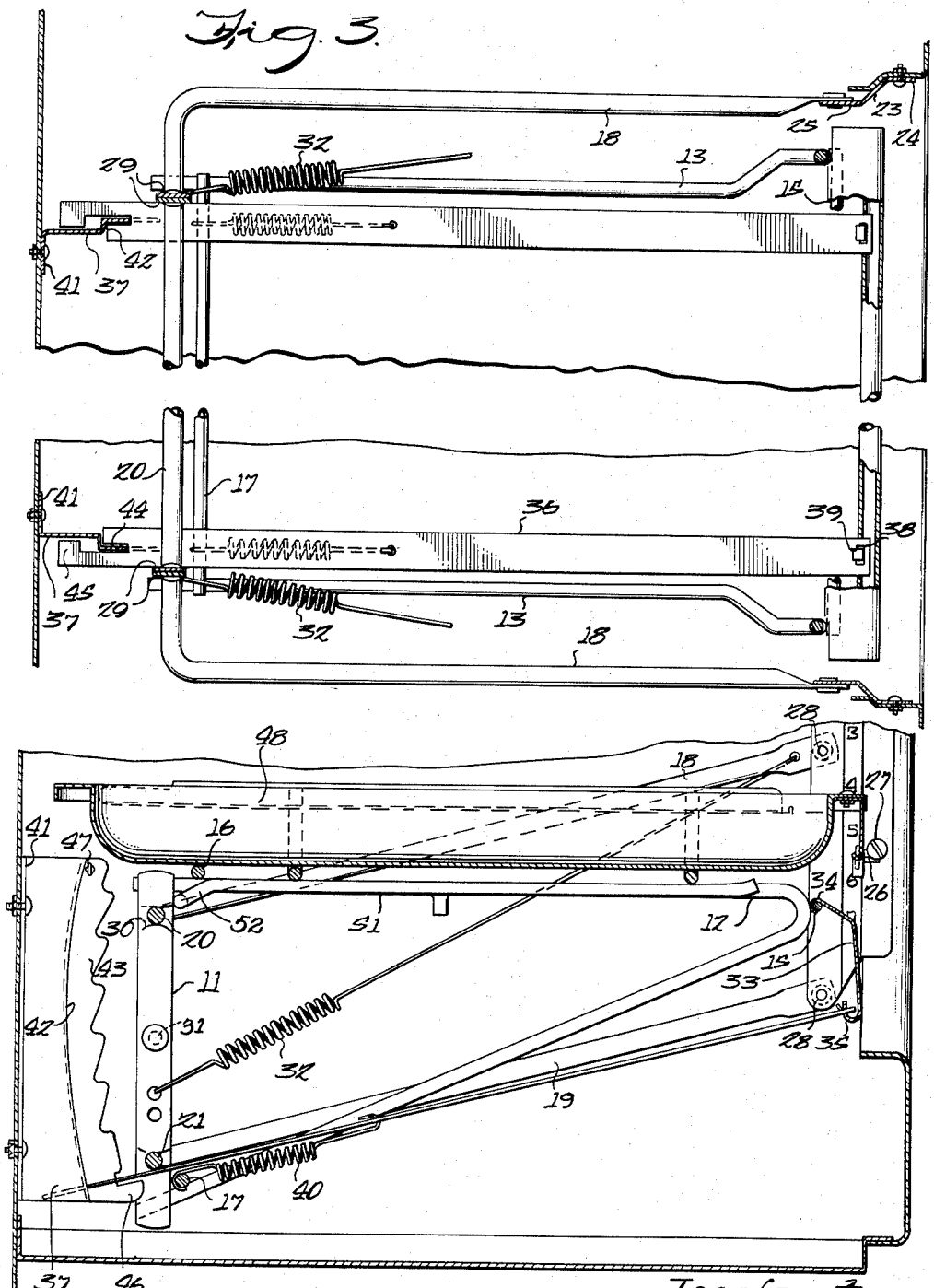

United States Patent Office 2,868,190
Patented Jan. 13, 1959

2,868,190

ADJUSTABLE BROILER MECHANISM

Herbert M. Reeves, Kankakee, Ill., assignor to Geo. D. Roper Corporation

Application December 24, 1954, Serial No. 477,472

5 Claims. (Cl. 126—41)

This invention relates to an oven type broiler mechanism.

The increased popularity of broiling as a means of food preparation has led to demands for larger and more conveniently usable broiling ovens. A broiling oven separate from the baking oven is now common in home cooking equipment, the broiling oven usually matching the baking oven in over-all height. With this increased usable size, it is practical to broil large roasts, whole hams, large fowls and the like providing the equipment can be made convenient and practical for home use. In many broilers heretofore a pull-out drawer has been employed having slides or runners for optionally positioning the pan height in relation to a broiler heat source such as a gas flame at the top of the oven. In others, slides are simply provided on the oven linings to support a broiler pan. It is, of course, highly desirable that more convenient means be employed for home cooking of large or heavy items that permits easy adjustment of a broiler pan height and also permits ready access for inspection or removal of the food item. It is also required that the broiler mechanism meet requirements of both safety and attractiveness in appearance while still remaining practical from an economic standpoint.

It is a primary object of my invention to provide an attractive, practical, and easily adjustable broiler mechanism.

It is another object of my invention to provide a separate broiling oven assembly which may be conveniently and safely utilized for home broiling.

It is a further object of my invention to provide a broiler mechanism incorporating or permitting quick adjustment of the pan height in relation to the broiling flame.

It is a further object to provide a broiler mechanism permitting the broiler pan to be pulled outward in fully supported position for access.

It is a still further object to provide for a front-opening broiler oven a broiler mechanism which is self-contained and readily installed.

Other objects and advantages of the invention will become apparent from the following detailed description of the preferred embodiment in which:

Fig. 3 is a sectional view along lines 3—3 of Fig. 2.

Fig. 4 is a sectional side view corresponding to Fig. 2 but showing the broiler pan in its lowest position.

Figures 1, 2:
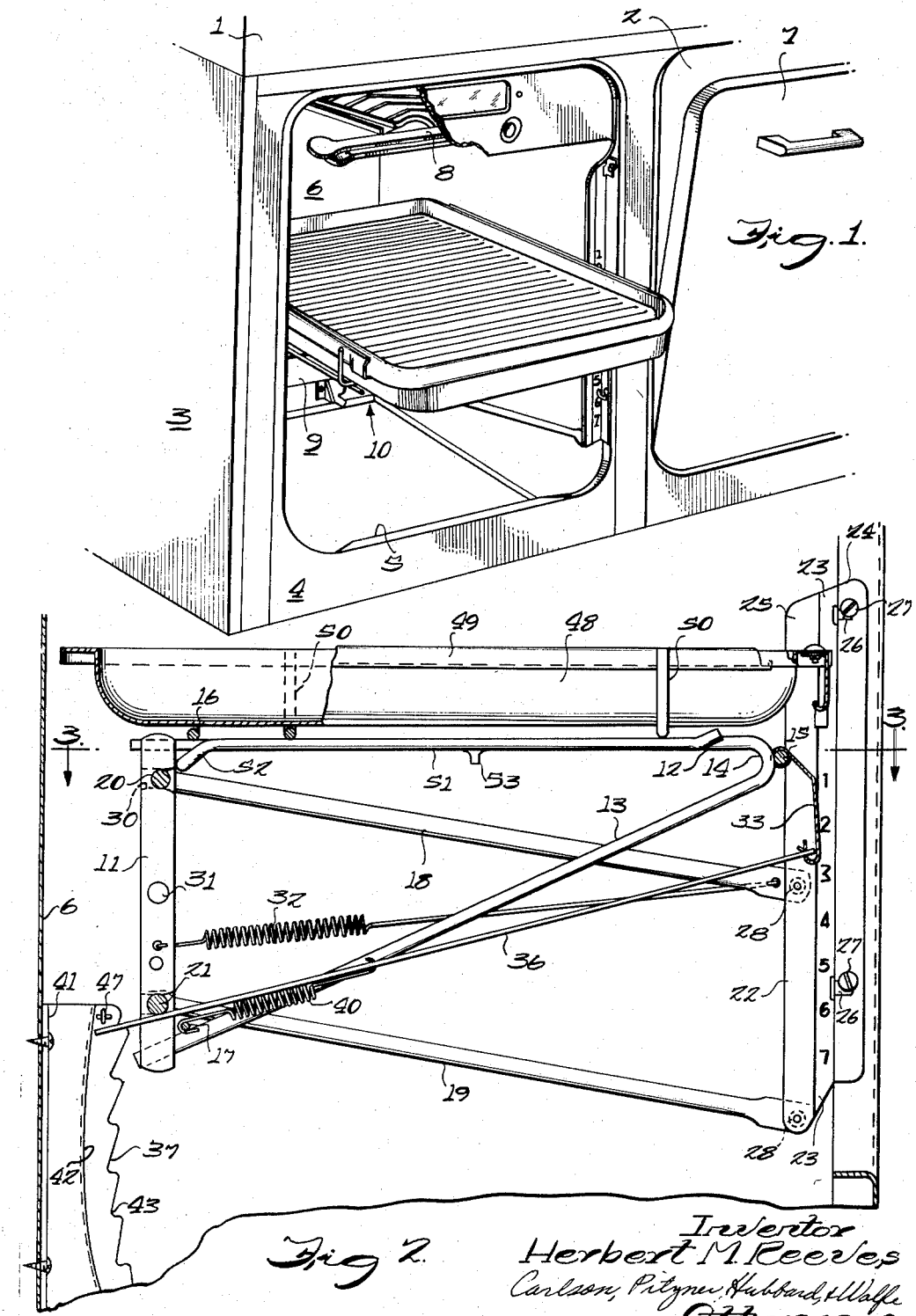
Figure 1 is a perspective view illustrating the broiler oven of a cook stove equipment (with the broiler pan partially extended), the oven door being removed for the purpose of better illustrating the invention.
Fig. 2 is a sectional side view of the oven of Fig. 1 but with the broiler pan raised to its highest position.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

Referring first to Fig. 1, my invention is shown incorporated in a broiling oven 1 designed in this case as a companion equipment to a baking oven 2 of the same overall height. The broiling oven, while shown here as defined by a suitably insulated rectangular tabletop floor cabinet 3, may, of course, be incorporated in other pieces of cooking equipment. The oven has a front panel 4 with a rectangular opening 5 provided to accommodate an oven door (not shown), and a rear panel 6. The broiler oven door may be similar to the door 7 partially shown for the baking oven 2 and is not coupled to the adjustable broiler machanism or to the broiler pan. The heat source for the broiler may suitably be a gas burner 8 positioned near the top or roof of the oven and designed to provide a downwardly directed gas flame. Since the burner is fixed in place, an adjustable broiler mechanism is required to support the item to be broiled at a readily adjusted height with respect to the gas burner flame.

In accordance with my invention, a broiler mechanism is incorporated in the oven having a vertically swingable elevator assembly 9 and a horizontally slidable extension rack assembly 10. It is to this novel structure by which the broiler pan is supported for easily adjustable height and ready for convenient outward extension that the following paragraphs are directed.

Referring first to the elevator assembly 9, the elevator frame or platform itself has two vertically extending rear corner support posts 11 to which the elevating linkage is connected. A forwardly extending horizontal bar 12 is welded or otherwise fixed to the upper end of each corner post 11 to provide the supporting guide for the rack assembly 10. In order that the rods 12 of the elevator frame can support adequately heavy broiler loads, angular braces 13 fixed between the bottom of each upright post 11 and the forward end of each horizontal bar 12 are provided. As shown in the drawing, the horizontal and inclined members 12 and 13 are preferably a unitary structure formed by bending a steel rod at an intermediate portion 14 to form an acute angle between the links thereof. The two triangular frame sections thus formed are spaced from each other by lateral braces 15, 16 and 17, these braces suitably made of steel rod stock. The front brace 15 has its ends welded to the forward ends of the horizontal bars 12 which in this case are at the outside of the bend areas 14. Braces 16 and 17 are suitably respectively welded between the end portions of the bars 12 and of the bars 13 near their juncture with the vertical posts 11. The width of the braces is selected to space the triangular side frame portions by a distance somewhat less than the width of the oven, the frame thus constructed being designed to be located in the oven with the upright vertical members 11 near their rear corners of the oven and with the front lateral brace 15 near the front and accessible when the oven door is open.

To provide a vertically swingable motion for the elevator frame or platform, upper and lower links 18 and 19 respectively are pivotally connected between each vertical post 11 and each corresponding side of the oven front opening 5. It will be obvious of course that with the upper and lower links connected to pivot points spaced by a given distance, both on the oven side and on the upright posts, the upper bars 12 of the elevator frame will remain horizontal at any elevation of the links.

The links themselves are also arranged to additionally stabilize the platform and maintain it rigidly, especially against lateral movement or tilting, by making each pair of opposite side links a unitary structure. Thus, as particularly shown in Fig. 3, the top swinging links 18 are the sides or legs of a U-shaped member made from a single length of steel bar stock with a mid portion 20 passing through the posts 11 to serve to a large extent as additional transverse members of the elevator frame itself. The lower links 19 have a corresponding integral transverse bar 21. The length of the links is selected so that the rear part of the elevator frame assembly is spaced from the oven rear panel. The vertically swingable motion of the elevator frame is accompanied by only a small forward or rearward displacement, the links being suitably swingable from a small angle above the horizontal from the uppermost elevator position (as shown in Fig. 2) to a correspondingly small angle below the horizontal for the lowermost elevator position (as shown in Fig. 4).

The hinge connections of the swingable links to both the oven and the elevator frame are particularly adapted to facilitate economical and convenient manufacture and maintenance of the broiler mechanism.

Thus, instead of pivoting the front ends of the links 18 and 19 to vertically spaced points on the oven panel itself, connection may be to removable side brackets 22. Each of these vertical brackets 22 has a center web or face portion 23 and vertical outer and inner side flanges 24 and 25 bent in parallel planes. The outer side flange 24 of each bracket 22 is bolted to the inturned flange of the oven panel 4 at each side of the oven door opening 5 through upper and lower slots 26 in the side flanges. When the brackets are in place, the web portions 23 extend obliquely inward to present the inner side flanges 25 spaced by a distance somewhat less than the oven opening. The slots 26 in the side flanges 24 each open into a larger diameter slot portion on the web 23. Thus when the mounting bolts 27 are loosened, the brackets 22 may be pulled upwardly and outwardly to be unhooked from the bolts. The inner flanges 25 are apertured near the bottom and near an intermediate portion thereof and the flat front ends of the swinging links 18 and 19 on each side of the broiler mechanisms are pivotally attached by hinge pins 28 through these apertures to the respective ones of the brackets 22. The center web or face portions 23 of the brackets 22 are preferably marked with reference numerals to indicate the vertical spacing of the elevator assembly.

In order to pivotally connect the transverse portions 20 and 21 of the swinging link assemblies to the upright posts, the posts are apertured near their upper and lower ends respectively to permit the passage of the upper and lower transverse link portions 20 and 21 therethrough. Rather than attempt to thread the U-shaped link assemblies through bores in the upright posts, however, each upright post 11 is made of two thicknesses or straps 29 (as indicated in Fig. 3). Each strap 29 has upper and lower side slots or notches 30 extending in from one side, the vertical distance between the slots being the same as between the hinge pins 28 at the front end of the swinging links. The respective straps 29 of each post assembly are hooked over the transverse link portions 20 and 21 from opposite directions and clamped, suitably by a rivet 31. No separate hinge pins are required since the portions 20 and 21 of the swinging links serve this function in addition to comprising structural lateral members of the elevator frame. The elevator assembly 9 thus far described may accordingly as a unit be hooked over the heads of the bolts 27 at the front panel opening of the oven for support therefrom.

A lifting means is self-contained in the assembly 9 to effectively counterbalance the weight of the elevator and broiling rack assemblies 9 and 10. For this purpose a pair of lifting springs 32 is suitably employed, one at each side of the broiler elevator assembly. As shown, one end of each spring is hooked to a lower portion of each vertical rear post 11 and the other end is connected to a correspondingly higher point on the front of the assembly, preferably at the forward end of the upper elevator links. The tension of the spring is selected to create a lift almost equalling the unloaded weight of the elevator 9 and extensible rack assembly 10.

To facilitate raising and lowering of the elevator assembly 9 an operating apron 33 is hung from the elevator frame transverse spacer bar 15. This apron is preferably made of sheet steel having an upper edge 34 bent around the bar to permit a partial rotation or in-and-out adjustment of the lower part of the apron. The lower edge 35 of the apron is bent over inwardly to present a smoothly curved lower surface for convenience and safety in manual lifting of the apron and the attached elevator frame. The apron is suitably finished for attractiveness and has marked at its sides indicating arrows or other indicia for alinement of the broiler height with the scale markings on the oblique face 23 of either elevator support bracket 22.

It will be appreciated that the entire elevator assembly and the extensible rack assembly on it and which is described in later paragraphs, can be readily adjusted in height by grasping and lifting the apron, the force required to overcome the weight being overcome to a large extent by the lift of the springs 32 previously described. The housewife or other user of the broiler can thus easily lift the broiler mechanism and readily determine its position with reference to the scale numerals.

After adjustment to the desired height, the elevator assembly is locked in the predetermined position by use of a locking bar 36 and multi-notched support bracket 37 at each side of the oven.

Each locking bar 36 is suitably made of flat steel stock and has a slotted aperture 38 at one end, so that it can be hooked over a tab or ear 39 on the lower edge portion 35 of the apron 33. Each strap or bar 36 is long enough so that it can extend under past the elevator frame to engage the notched bracket 37 supported from the rear panel of the cabinet. The flat side of the strap suitably passes directly under the lower transverse leg 21 connecting the lower swinging links 19 so as to serve for all practical purposes as a stop or projection part of the frame itself. This projecting part of the strap or bar is made retractable by reason of the fact that the apron 33 is hinged so that when the lower edge 35 of the apron is pulled outwardly, the strap is pulled outwardly with it. The normal locking position of the strap is maintained by a locking spring 40, this spring suitably being connected in tension between the lower rear lateral spacing bar 17 and an intermediate point on the locking bar itself.

A feature of the position locking means is the arrangement of the lower end of the locking strap or bar 36 relative to the notched bracket 37. Each bracket itself is suitably formed from sheet steel with a supporting flange 41 so that it may be mounted vertically on the lower inside surface of the rear oven panel. The bracket is reversely bent to provide it with a restraining shoulder 42 from which the notched portion 43 forwardly extends. These notches are suitably evenly spaced along a slightly arcuate vertical path to provide support for the locking bar end at elevations corresponding to the various scale markings at the front of the oven. The engagement of the locking bar with the notches is also preferably arranged to limit the locking bar retraction to the extent necessary for permitting adjustment.

As shown in Fig. 3, the locking bar is also held against complete disengagement with the bracket 37. The locking bar end is slotted or cut away at 44 to define a lengthwise slot 44 of sufficient width to slide over the notch bracket 37 with a locking bar endmost hook portion 45 at one side of the slot extending beyond and around the portion on the other side to hook the bracket shoulder 42. This limits the forward or backward travel of the locking bar. The lowermost portion 46 of the bracket extends forward a greater distance than the locking bar travel to prevent the locking bar from being withdrawn far enough to drop the elevator assembly further. A stop such as a cutter key 47 in the notched flange 43 near the top portion thereof prevents the locking bar from traveling further upward to thus limit the upper position. The cotter key is easily removed, however, so as to permit the locking bar to be disengaged from the bracket so that the entire broiler mechanism can be easily removed.

Thus it may be seen that while the elevator 9 is itself completely self-contained, the locking lever engaging the bracket on the rear oven wall insures complete stability of the broiler at the preselected height. The locking lever is readily pulled outward when the front apron 33 is lifted to raise or lower the elevator assembly 9.

Referring now to the extensible rack assembly 10, a conventional rectangular broiler pan 48 of a size to fit the oven door opening 5 is supported in a sliding frame. This frame includes two laterally spaced channel members 49 which hold the sides of the broiler pan firmly but permit it to be removed for cleaning. The channel members are spaced by U-shaped bars 50 extending transversely between the channels and preferably welded thereto. Guides 51 suitably made of circular bar steel stock are welded at each side of the frame thus formed to the bottom of the transverse members 50. The slide assembly is dimensioned to slide on and be guided by the horizontal bars 12 of the elevator platform. The transverse portions of the U-shaped frame supports 50 are slightly longer than the spacing between the elevator bars 12 so as to support the frame thereon, and the frame guides 51 are spaced by a distance slightly less than the spacing between the elevator bars 12 so as to slide between them when the frame is pulled out or pushed into the oven.

In order to prevent the frame from tipping at the extended position, the inner ends 52 of the guides 51 are bent down and under the elevator bars 12 so as to be slidably hooked under them. The limiting position of the frame is suitably provided by stops 53 extending downwardly from an intermediate portion of each of the guides 51. When the slide is extended outward to the desired furthermost position, the stops 53 engage the upper front lateral spacing bar 15 of the elevator frame. The broiler tray itself may be further slided outward with respect to the channel members 49 safely without disengagement of the slide assembly from the elevator.

Should it be desired to remove the slide assembly, it need only be lifted upward so that the stops 53 clear the front apron bar and pulled forward to be lifted out of position.

It should be noted that the broiler rack assembly is retractable at any vertical level of the elevator assembly, but is supported entirely from the elevator assembly. Likewise, it should also be noted that while the spring tension may be made sufficient to raise the remaining mechanism when the broiler pan and rack have been removed for cleaning, the cotter stop means 47 in the notched bracket 37 limits the upward lift without requiring any precautionary measures.

I claim as my invention:

1. In a broiling oven having a front opening, a vertical notched bracket at the rear of said oven; a broiling rack support frame comprising two laterally spaced horizontal rack support members extending into the oven, a pair of vertical support members located in the rear of the oven and each connected at its upper end to the inner end of one of the horizontal rack support members, each of said horizontal members having an integral brace extending from its forward portion back to each vertical support member and connected to a lower point thereon, a front transverse support bar connected between said horizontal members, and a transverse apron member pivotally connected to and depending from said transverse bar; means for supporting the horizontal members at an adjustable height with respect to the vertical notched bracket comprising upright support brackets fastened at opposite sides of the front oven opening, two vertically spaced parallel U-shaped bars, the upper bar having its mid portion pivotally coupled to upper points on each of said vertical support members and having its ends pivotally coupled to said suport brackets, the lower bar having its mid portion pivotally coupled to lower points each of said vertical support members and having its ends pivotally connected to lower points on said upright support brackets; position locking means for the rack support frame comprising a locking bar fastened to said apron and extending in underlying supporting relation to the rear portion of one of said U-shaped rods toward said notched bracket, and tension spring means for biasing said locking bar into one of said notches to provide secure engagement therebetween at the given height corresponding to the selected notch, said apron transverse member being outwardly movable for an extent necessary to disengage said spring biased locking bar from the notched rack when the frame height is adjusted; and a horizontally extensible broiler tray slide frame including a pair of alined, laterally spaced guide bars adjacent said horizontal rack support members, said guide bars each having one end formed to fit at least partially under the adjacent one of said horizontal rack support members to provide a connection for preventing tipping when the slide is pulled outwardly.

2. In a broiling oven having a front opening, a vertical notched bracket at the rear of said oven; a broiling rack support frame comprising two laterally spaced horizontal rack support members extending into the oven, a pair of vertical support members located in the rear of the oven and each connected at its upper end to the inner end of one of the horizontal rack support members, each of said horizontal members having an integral brace extending from its forward portion back to each vertical support member and connected to a lower point thereon, a front transverse support bar connected between said horizontal members, and a transverse apron member pivotally connected to and depending from said transverse bar; means for supporting the horizontal members at an adjustable height with respect to the vertical notched bracket comprising upright support brackets fastened at opposite sides of the front oven opening, two vertically spaced parallel U-shaped bars, the upper bar having its mid portion pivotally coupled to upper points on each of said vertical support members and having its ends pivotally coupled to said support brackets, the lower bar having its mid portion pivotally coupled to lower points on each of said vertical support members and having its ends pivotally connected to lower points on said upright support brackets; and position locking means for the rack support frame comprising a locking bar fastened to said apron and extending in underlying supporting relation to the rear portion of one of said U-shaped rods toward said notched bracket, and tension spring means for biasing said locking bar into one of said notches to provide secure engagement therebetween at the given height corresponding to the selected notch, said apron transverse member being outwardly movable for an extent necessary to disengage said spring biased locking bar from the notched rack when the frame height is adjusted.

3. In a broiling oven having a front opening, a broiling rack support frame having a generally rectangular horizontal rack support member disposed in the oven, substantially vertical frame means located in the rear of the oven and rigidly connected at its upper portion to the rear portion of said horizontal rack support member, said frame means extending transversely to said horizontal member over a substantial portion of the latter's width; and means for supporting said horizontal member at an adjustable height comprising a support bracket secured in the oven adjacent the front opening thereof, means including parallel swinging links spaced apart vertically and pivotally interconnected between said substantially vertical frame means and said support bracket, a vertical notched bracket mounted at the rear of said oven; and a locking bar shiftably connected to the front of said horizontal member and extending in underlying relation to said substantially vertical frame means into releasable engagement with said notched bracket for cooperating with the latter to support the broiling rack support frame at a desired frame height.

4. In a broiling oven having a front opening, a broiling rack support frame having a generally rectangular horizontal rack support member extending into the oven, laterally spaced substantially vertical frame members located in the rear of the oven and rigidly connected at their upper portions to the rear corners of said horizontal member, and a transverse member connected between said spaced vertical frame members; and means for supporting said horizontal member at an adjustable height comprising a support bracket secured in the oven adjacent the front opening thereof, means including parallel swinging links spaced apart vertically and pivotally interconnected between said substantially vertical frame members and said support bracket, a vertical notched bracket mounted at the rear of said oven; and a locking bar shiftably connected to the front of said horizontal rack support member and extending between said vertical frame members and in underlying, supporting relation to said transverse member into releasable engagement with said notched bracket for cooperating wtih the latter to support the broiling rack support frame at a desired height.

5. In a broiling oven having a front opening, a unitary adjustable broiler mechanism comprising, in combination, a broiling rack support frame disposed in the oven, said frame having a generally rectangular horizontal portion and a vertical portion rigidly connected to and projecting downwardly from the rear edge of said horizontal portion, said vertical portion extending transversely to said horizontal portion over a substantial portion of the latter's width, a support bracket removably secured in the oven adjacent the front opening thereof, parallel swinging links spaced apart vertically and pivotally interconnected between said bracket and said vertical portion, a bracket having vertically spaced notches mounted at the rear of the oven, and a locking bar shiftably connected to the front of said horizontal portion and extending in underlying, supporting relation to the bottom of said vertical portion, the rear end of said locking bar being selectively engageable with the notches of said last-named bracket to support said broiling rack support frame at adjustable heights.

References Cited in the file of this patent

UNITED STATES PATENTS

| | | |
|---|---|---|
| 1,181,722 | Ball | May 2, 1916 |
| 1,872,733 | Greenwald | Aug. 23, 1932 |
| 2,114,697 | Babin | Apr. 19, 1938 |
| 2,348,720 | Bobo | May 16, 1944 |